US012684439B2

(12) United States Patent
Lyu et al.

(10) Patent No.: US 12,684,439 B2
(45) Date of Patent: Jul. 14, 2026

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/052,626

(22) Filed: Feb. 13, 2025

(65) Prior Publication Data

US 2025/0184845 A1      Jun. 5, 2025

Related U.S. Application Data

(63) Continuation of application No. PCT/CN2023/111067, filed on Aug. 3, 2023.

(51) Int. Cl.
| | |
|---|---|
| *H04W 36/08* | (2009.01) |
| *H04W 8/22* | (2009.01) |
| *H04W 76/20* | (2018.01) |
| *H04W 84/06* | (2009.01) |

(52) U.S. Cl.
CPC ............. *H04W 36/08* (2013.01); *H04W 8/22* (2013.01); *H04W 76/20* (2018.02); *H04W 84/06* (2013.01)

(58) Field of Classification Search
CPC ..... H04W 24/02; H04W 24/10; H04W 64/00; H04W 76/27; H04W 76/15; H04W 24/08; H04L 5/001; H04L 5/0098
See application file for complete search history.

(56) References Cited

U.S. PATENT DOCUMENTS

| | | | | |
|---|---|---|---|---|
| 2021/0105693 | A1* | 4/2021 | Tripathi | H04W 84/06 |
| 2021/0297923 | A1* | 9/2021 | Wei | H04W 84/005 |
| 2021/0329518 | A1* | 10/2021 | Sharma | H04W 36/322 |
| 2024/0280706 | A1* | 8/2024 | Peng | G01S 5/009 |
| 2024/0334223 | A1* | 10/2024 | Hu | H04W 24/02 |
| 2024/0357460 | A1* | 10/2024 | Cho | H04W 36/322 |
| 2024/0421893 | A1* | 12/2024 | Tao | H04B 7/18513 |

(Continued)

FOREIGN PATENT DOCUMENTS

| | | |
|---|---|---|
| CN | 116033502 A | 4/2023 |

OTHER PUBLICATIONS

International Search Report and Written Opinion in International Appln. No. PCT/CN2023/111067, mailed on Feb. 7, 2024, 8 pages (with partial English translation).

*Primary Examiner* — Congvan Tran
(74) *Attorney, Agent, or Firm* — Fish & Richardson P.C.

(57) ABSTRACT

The present application provides a method and an apparatus for wireless communication. One example method includes: A terminal device determines, based on first information, one or more first TN regions in an NTN cell that are related to the terminal device, where the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

19 Claims, 4 Drawing Sheets

A terminal device determines, based on first information, one or more first TN regions in an NTN cell that are related to the terminal device

S410

(56)          References Cited

U.S. PATENT DOCUMENTS

| | | | |
|---|---|---|---|
| 2025/0016642 A1* | 1/2025 | Lyu ....................... | H04W 36/08 |
| 2025/0081072 A1* | 3/2025 | Nuggehalli .......... | H04B 7/1853 |
| 2025/0106623 A1* | 3/2025 | Shrestha ........... | H04W 12/0431 |

\* cited by examiner

100

200

300

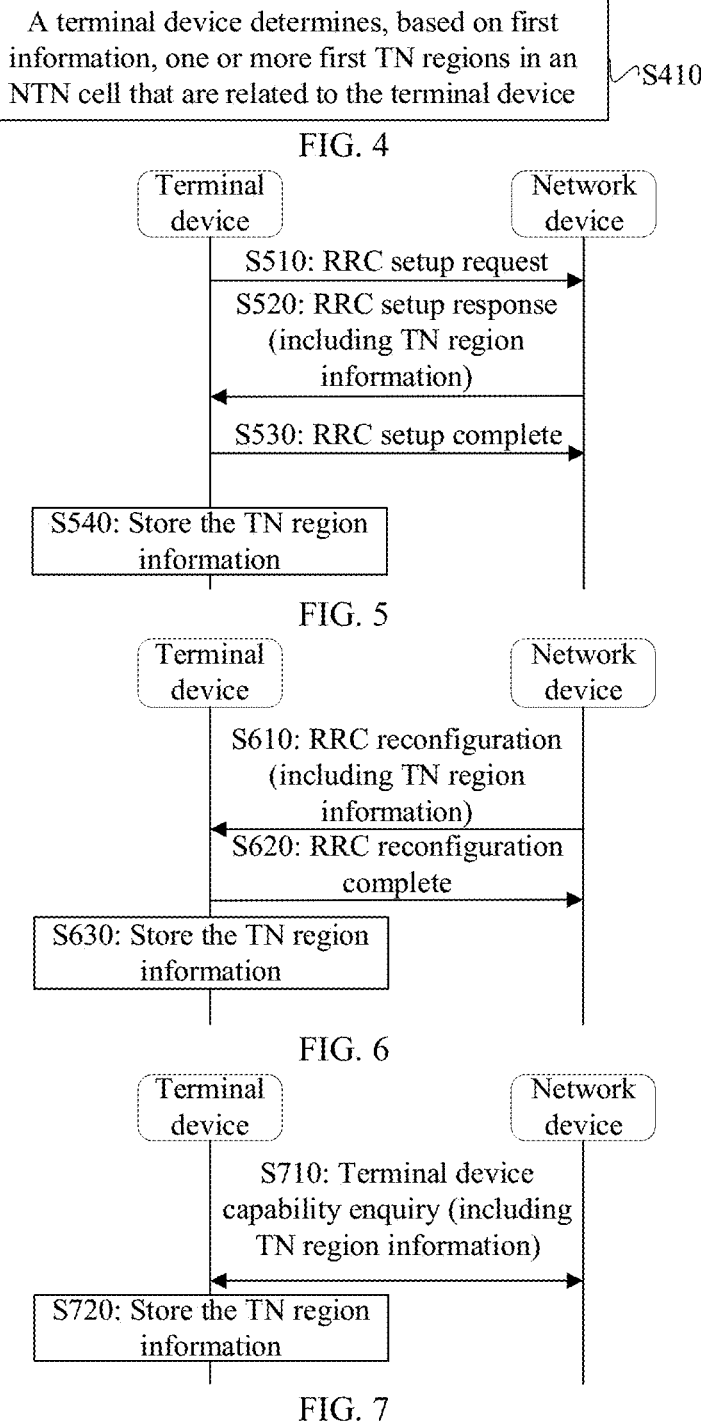

A terminal device determines, based on first information, one or more first TN regions in an NTN cell that are related to the terminal device   S410

FIG. 4

Terminal device        Network device

S510: RRC setup request

S520: RRC setup response (including TN region information)

S530: RRC setup complete

S540: Store the TN region information

FIG. 5

Terminal device        Network device

S610: RRC reconfiguration (including TN region information)

S620: RRC reconfiguration complete

S630: Store the TN region information

FIG. 6

Terminal device        Network device

S710: Terminal device capability enquiry (including TN region information)

S720: Store the TN region information

FIG. 7

METHOD AND APPARATUS FOR WIRELESS COMMUNICATION

CROSS-REFERENCE TO RELATED APPLICATIONS

This application is a continuation of International Application No. PCT/CN2023/111067, filed on Aug. 3, 2023, the disclosure of which is hereby incorporated by reference in its entirety.

TECHNICAL FIELD

The present application relates to the field of communications technologies, and more specifically, to a method and an apparatus for wireless communication.

BACKGROUND

In a non-terrestrial network (NTN) system, an NTN cell has a large coverage range, and may include a plurality of terrestrial network (TN) cells. Due to the mobility of the NTN system, a terminal device handing over from the NTN cell to the TN cell or reselecting the TN cell is conducive to ensuring service continuity. However, how to enable the terminal device to determine a TN cell related to the terminal device within a coverage range of the NTN serving cell is a problem to be resolved.

SUMMARY

The present application provides a method and an apparatus for wireless communication. Various aspects of embodiments of the present application are described below.

According to a first aspect, a method for wireless information is provided, and includes: determining, by a terminal device based on first information, one or more first TN regions in an NTN cell that are related to the terminal device, where the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

According to a second aspect, a method for wireless communication is provided, and includes: sending, by a network device, first information to a terminal device, where the first information is used to determine one or more first TN regions in an NTN cell that are related to the terminal device, the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

According to a third aspect, an apparatus for wireless communication is provided. The apparatus is a terminal device, and the terminal device includes: a determining unit, determining, based on first information, one or more first TN regions in an NTN cell that are related to the terminal device, where the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

According to a fourth aspect, an apparatus for wireless communication is provided. The apparatus is a network device, and the network device includes: a sending unit, sending first information to a terminal device, where the first information is used to determine one or more first TN regions in an NTN cell that are related to the terminal device, the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

According to a fifth aspect, a communications apparatus is provided, including a memory and a processor, where the memory is configured to store a program, and the processor is configured to invoke the program in the memory to perform the method according to the first aspect or the second aspect.

According to a sixth aspect, an apparatus is provided. The apparatus includes a processor invoking a program from a memory to perform the method according to the first aspect or the second aspect.

According to a seventh aspect, a chip is provided. The chip includes a processor invoking a program from a memory to cause a device on which the chip is installed to perform the method according to the first aspect or the second aspect.

According to an eighth aspect, a computer-readable storage medium is provided. The computer-readable storage medium stores a program that causes a computer to perform the method according to the first aspect or the second aspect.

According to a ninth aspect, a computer program product is provided. The computer program product includes a program that causes a computer to perform the method according to the first aspect or the second aspect.

According to a tenth aspect, a computer program is provided. The computer program causes a computer to perform the method according to the first aspect or the second aspect.

In embodiments of the present application, a terminal device may determine, based on parameter information of some or all TN regions corresponding to an NTN cell, a TN region related to the terminal device. The TN region related to the terminal device may be used to determine a target TN cell to which the terminal device performs cell handover or cell reselection.

BRIEF DESCRIPTION OF THE DRAWINGS

FIG. 4 is a schematic flowchart of a method for wireless communication according to an embodiment of the present application.

FIG. 5 is a schematic flowchart of a possible implementation according to an embodiment of the present application.

FIG. 6 is a schematic flowchart of another possible implementation according to an embodiment of the present application.

FIG. 7 is a schematic flowchart of still another possible implementation according to an embodiment of the present application.

DETAILED DESCRIPTION OF THE EMBODIMENTS

Figure 1:
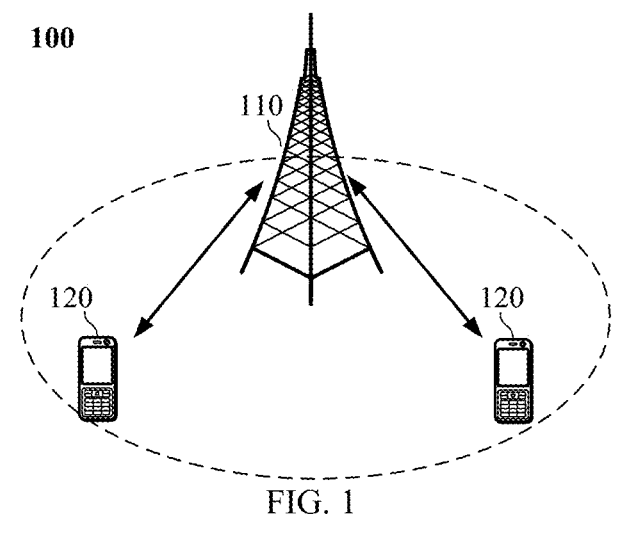
FIG. 1 shows a wireless communications system to which an embodiment of the present application is applied.

The following describes the technical solutions in embodiments of the present application with reference to the accompanying drawings in embodiments of the present application. Apparently, the described embodiments are some rather than all of embodiments of the present application. All other embodiments obtained by a person of ordinary skill in the art based on embodiments of the present application without creative efforts shall fall within the protection scope of the present application.

Embodiments of the present application may be applied to various communications systems. For example, embodiments of the present application may be applied to a global system for mobile communications (GSM), a code division multiple access (CDMA) system, a wideband code division multiple access (WCDMA) system, a general packet radio service (GPRS), a long term evolution (LTE) system, an advanced long term evolution (advanced long term evolution, LTE-A) system, a new radio (NR) system, an evolution system of an NR system, an LTE-based access to unlicensed spectrum (LTE-U) system, an NR-based access to unlicensed spectrum (NR-U) system, an NTN system, a universal mobile telecommunications system (UMTS), a wireless local area network (WLAN), wireless fidelity (WiFi), and a $5^{th}$ generation (5G) communications system. Embodiments of the present application may be further applied to another communications system, such as a future communications system. The future communications system may be, for example, a $6^{th}$ generation (6G) mobile communications system, or a satellite communications system.

A conventional communications system supports a limited quantity of connections and is easy to implement. However, with the development of communications technologies, a communications system may support not only conventional cellular communications but also one or more other types of communication. For example, the communications system may support one or more types of the following communication: device to device (D2D) communication, machine to machine (M2M) communication, machine type communication (MTC), enhanced machine type communication (eMTC), vehicle to vehicle (V2V) communication, vehicle to everything (V2X) communication, and the like. Embodiments of the present application may also be applied to a communications system that supports the foregoing communication manners.

A communications system in embodiments of the present application may be applied to a carrier aggregation (CA) scenario, a dual connectivity (DC) scenario, or a standalone (SA) networking scenario.

A communications system in embodiments of the present application may be applied to an unlicensed spectrum. The unlicensed spectrum may also be considered as a shared spectrum. Alternatively, a communications system in embodiments of the present application may be applied to a licensed spectrum. The licensed spectrum may also be considered as a dedicated spectrum.

Embodiments of the present application may be applied to an NTN system. For example, the NTN system may include a 4G-based NTN system, an NR-based NTN system, an internet of things (IoT)-based NTN system, and a narrow band internet of things (NB-IoT)-based NTN system.

The communications system may include one or more terminal devices. The terminal device in embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like.

In some embodiments, the terminal device may be a station (ST) in a WLAN. In some embodiments, the terminal device may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal device in a next-generation communications system (such as an NR system), a terminal device in a future evolved public land mobile network (PLMN), or the like.

In some embodiments, the terminal device may be a device that provides a user with voice and/or data connectivity. For example, the terminal device may be a handheld device, a vehicle-mounted device, or the like with a wireless connection function. In some specific examples, the terminal device may be a mobile phone, a tablet computer (Pad), a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, or a satellite.

In addition to the terminal device, the communications system may further include one or more network devices.

The network device in embodiments of the present application may be a device for communicating with the terminal device. The network device may also be referred to as an access network device or a wireless access network device. The network device may be, for example, a base station. The network device in embodiments of the present application may be a radio access network (RAN) node (or device) that connects the terminal device to a wireless network. The base station may broadly cover various names in the following, or may be interchangeable with the following names, for example: a NodeB, an evolved NodeB (eNB), a next-generation NodeB (gNB), a relay station, an access point, a transmitting and receiving point (TRP), a transmitting point (TP), a master eNodeB (MeNB), a secondary eNodeB (SeNB), a multi-standard radio (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or the apparatus described above. The base station may alternatively be a mobile switching center, a device that functions as a base station in D2D, V2X, and M2M communication, a network-side device in a 6G network, a device that functions as a base station in a future communications system, or the like. The base station may support networks with a same access technology or different access technologies. A specific technology and a specific device form used by the network device are not limited in embodiments of the present application.

The base station may be fixed, or may be mobile. For example, a helicopter or an unmanned aerial vehicle may be configured to function as a mobile base station, and one or more cells may move depending on a location of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

As an example rather than limitation, in embodiments of the present application, the network device may have a mobile feature, for example, the network device may be a movable device. In some embodiments of the present application, the network device may be a satellite or a balloon station. In some embodiments of the present application, the network device may alternatively be a base station arranged on land, water, or the like.

In embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell. The small cell herein may include: a metro cell, a micro cell, a pico cell, a femto cell, and the like. These small cells have a characteristic of a small coverage range and low transmit power, and are suitable for providing a high-rate data transmission service.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographical region, and may communicate with a terminal device within the coverage region.

FIG. 1 exemplarily shows one network device and two terminal devices. In some embodiments of the present application, the communications system 100 may include a plurality of network devices, and another quantity of terminal devices may be included within a coverage range of each network device. This is not limited in embodiments of the present application.

Figure 2:
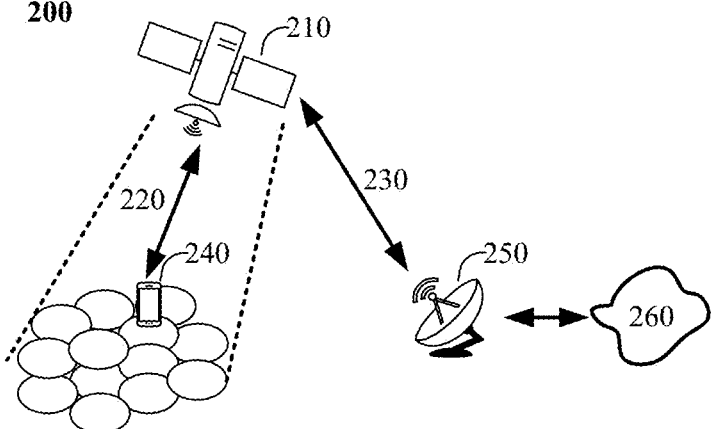
FIG. 2 shows an NTN system to which an embodiment of the present application is applied.

For example, FIG. 2 is a schematic diagram of an architecture of the NTN system mentioned above. An NTN system 200 shown in FIG. 2 uses a satellite 210 as an air platform. As shown in FIG. 2, a satellite radio access network includes the satellite 210, a service link 220, a feeder link 230, a terminal device 240, a gateway (GW) 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The Earth-based gateway 250 connects the satellite 210 to the base station or the core network, depending on selection of the architecture.

The NTN architecture shown in FIG. 2 is a bent pipe transponder architecture. In this architecture, the base station is located on the Earth behind the gateway 250, and the satellite 210 serves as a relay. The satellite 210 operates as a repeater for forwarding signals of the feeder link 230 to the service link 220, or forwarding signals of the service link 220 to the feeder link 230. In other words, the satellite 210 does not have a function of a base station, and communication between the terminal device 240 and the base station in the network 260 is required to be relayed through the satellite 210.

Figure 3:
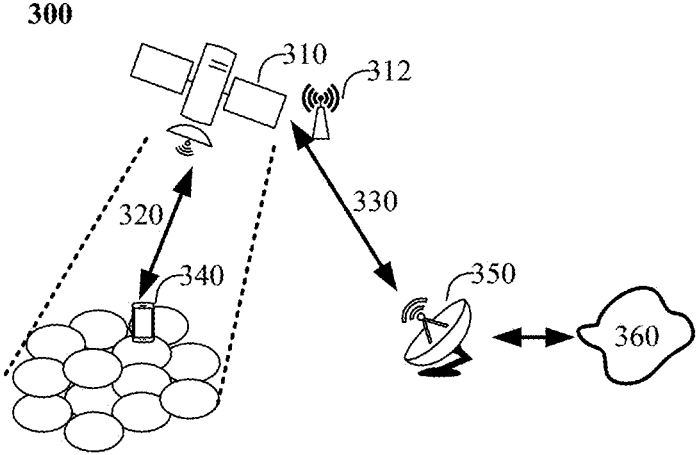
FIG. 3 shows another NTN system to which an embodiment of the present application is applied.

For example, FIG. 3 is a schematic diagram of another architecture of the NTN system. As shown in FIG. 3, a satellite radio access network 300 includes a satellite 310, a service link 320, a feeder link 330, a terminal device 340, a gateway 350, and a network 360. FIG. 3 differs from FIG. 2 in that a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to an Earth-based core network through a link. The satellite 310 has a function of a base station, and the terminal device 340 may directly communicate with the satellite 310. Therefore, the satellite 310 may be referred to as a network device.

The communications systems in the architectures shown in FIG. 2 and FIG. 3 may include a plurality of network devices, and another quantity of terminal devices may be included within a coverage range of each network device. This is not limited in embodiments of the present application.

In embodiments of the present application, the wireless communications system shown in FIG. 1 to FIG. 3 may further include another network entity such as a mobility management entity (MME) or an access and mobility management function (AMF). This is not limited in embodiments of the present application.

It should be understood that a device with a communication function in a network/system in embodiments of the present application may be referred to as a communications device. The communications system 100 shown in FIG. 1 is used as an example. A communications device may include a network device 110 and a terminal device 120 with a communication function, and the network device 110 and the terminal device 120 may be specific devices described above. Details are not described herein again. The communications device may further include other devices in the communications system 100, such as a network controller, a mobility management entity, and other network entities. This is not limited in embodiments of the present application.

For ease of understanding, some related technical knowledge related to embodiments of the present application is first introduced. The following related technologies, as optional solutions, may be randomly combined with the technical solutions of embodiments of the present application, all of which fall within the protection scope of embodiments of the present application. Embodiments of the present application include at least part of the following content.

With the development of communications technologies, a communications system (for example, 5G) will have a market potential for integrating a satellite and a terrestrial network infrastructure. For example, 5G standards cause an NTN, including a satellite segment, to become a part of recognized 3rd generation partnership project (3GPP) 5G connection infrastructure.

An NTN is a network or a network segment that uses a radio frequency (RF) resource on a satellite or an unmanned aerial system (UAS) platform. A satellite is used as an example. Communications satellites are classified into low earth orbit (LEO) satellites, medium earth orbit (MEO) satellites, geostationary earth orbit (GEO) satellites, high elliptical orbit (HEO) satellites, and the like depending on different orbital altitudes. An LEO is an Earth-centered orbit with a height of 2000 km or less, or at least 11.25 periods per day, and an eccentricity less than 0.25. Most artificial objects in outer space are located on the LEO. The LEO satellites operate around the Earth at a high speed (mobility), but on a predictable or definite orbit.

Satellites with different orbital altitudes have different orbital periods.

The LEO has a typical height ranging from 250 km to 1500 km, and an orbital period ranging from 90 minutes to 120 minutes.

An MEO has a typical height ranging from 5000 km to 25000 km, and an orbital period ranging from 3 hours to 15 hours.

A GEO has a height of about 35786 km, and an orbital period of 24 hours.

It may be learned from FIG. 2 and FIG. 3 in which a satellite is used as an example that, a typical scenario for an NTN system accessing a terminal device involves an NTN transparent payload or an NTN regenerative payload. The bent pipe transponder architecture shown in FIG. 2 corresponds to the NTN transparent payload, and the regenerative transponder architecture shown in FIG. 3 corresponds to the NTN regenerative payload.

In the NTN system, the satellite and the unmanned aerial system both have relatively strong mobility. A cell projected to the ground by the satellite may be fixed relative to the ground, or may move with the satellite. A serving cell corresponding to an LEO satellite is used as an example. A cell projected by the LEO satellite to the ground usually includes two types: a quasi-Earth fixed cell and a quasi-Earth moving cell.

A cell stationary relative to the ground may be a serving cell covering a fixed geographical region. For example, different LEO satellites cover the same region on the ground by adjusting angles of antennas. When one LEO satellite cannot cover the region, another LEO satellite takes over. For a satellite located on a geosynchronous orbit (GSO), a cell projected to the ground may also be a fixed cell. For a satellite located on a non-geosynchronous orbit (NGSO), the fixed cell may be served by a plurality of satellites that perform covering alternately.

The moving cell may be a serving cell covering a changing geographical region. For example, the cell projected by the LEO satellite to the ground may move with the satellite. Generally, when the antenna of the LEO satellite is perpendicular to the ground, the cell projected by the LEO satellite to the ground is a moving cell. Whether the LEO satellite functions as an independent base station or a relay base station, the moving cell moves with the LEO satellite, and a relative distance between the LEO satellite and the terminal device changes all the time. After a period of time, a signal of the LEO satellite may not cover the terminal device. If network deployment is relatively complete, a next LEO satellite may cover the terminal device. Because a satellite system is spherical, the next LEO satellite may be located at various angles.

A coverage range of a serving cell in the NTN system is generally larger than that of a cellular network used by a conventional communications system (for example, NR). In some embodiments, in an NTN system based on satellite communication, a diameter of the NTN cell is at least 50 km. In some embodiments, the NTN cell may cover a plurality of cities deployed with TN cells, or may cover remote regions or ocean regions without TN cells. In some embodiments, a coverage range of the NTN cell may span countries. Therefore, in some scenarios, an actual quantity of TN cells within a complete coverage range of an NTN cell may be very large.

In a scenario of the quasi-Earth moving cell, the NTN cell covers different geographical regions as an air platform moves. Due to different geographical regions, TN regions covered by the moving cell are also different. It can be learned that if the NTN cell is updated, a TN geographical region currently covered by the NTN cell may also be updated accordingly. For example, for an earth moving cell, a coverage range of a serving cell moves due to movement of a satellite. Considering a high moving speed of the satellite, TN cell information corresponding to a moving cell is updated very frequently.

The NTN system is mobile, and TN deployment is relatively stationary, that is, a validity period of TN coverage data is very long. Therefore, for a terminal device in an NTN region, handing over from the NTN cell to the TN cell or reselection of the TN cell is conducive to ensuring service continuity. To facilitate the terminal device to be handed over to the TN region, when there is a TN coverage region within a coverage range of the NTN, a network (NW) is required to notify the terminal device of a coverage status of the TN region in the NTN cell. In other words, the terminal device is required to be aware of a surrounding TN region, to optimize a terminal device measurement used for cell handover or cell reselection. For example, a terminal device that performs vehicle-to-everything (V2X) edge communication in the NTN region is required to be aware of a neighboring TN coverage region to perform proper cell handover. For example, when performing radio resource control (RRC) resume, an inactive terminal device is required to be aware of a surrounding TN coverage region or base station information to ensure service continuity.

Further, in some scenarios of the NTN system, the terminal device may alternatively be in a high-speed motion state. In other words, a moving rate of the terminal device cannot be ignored relative to movement of the satellite. For these terminal devices, cell handover may have to be performed among a plurality of NTN cells and a plurality of TN cells along a motion trajectory, to ensure service continuity. Therefore, the terminal device is required to accurately learn TN regions or network device information along a running trajectory, to perform cell handover in a timely manner.

To optimize a terminal device measurement in a TN neighboring cell used for cell handover or cell reselection, how to provide a terminal device with a TN cell related to the terminal device within a coverage range of an NTN serving cell is a problem to be resolved.

It should be noted that, as mentioned above, because the NTN system has a large coverage range and the satellite and/or the terminal device are/is mobile, a problem that the terminal device is required to be notified of a TN coverage status is merely an example. Embodiments of the present application may be applied to any scenario in which a TN coverage status is required to be notified because a cell has a large coverage range or a communications device is mobile.

Based on this, embodiments of the present application provide a method for wireless communication. In this method, a terminal device may accurately know a TN coverage range (a TN region) within an NTN cell by using first information corresponding to signalling or a message, to determine a target TN cell for cell handover or cell reselection, so that it is beneficial for the terminal device to perform proper cell handover or reselection, thereby ensuring service continuity. For ease of understanding, the following describes in detail the method provided in embodiments of the present application with reference to FIG. 4.

As shown in FIG. 4, in Step S410, a terminal device determines, based on first information, one or more first TN regions in an NTN cell that are related to the terminal device.

The terminal device is any one of the terminal devices described above. In some embodiments, the terminal device is user equipment in a quasi-Earth fixed cell or a quasi-Earth moving cell of an NTN system. In some embodiments, the terminal device is a communications device that supports an NTN characteristic in both a GSO scenario and an NGSO scenario. For example, the terminal device supports mobility in the GSO scenario and the NGSO scenario.

The terminal device may be a device that performs a plurality of types of communication in an NTN coverage region. In some embodiments, the terminal device may be a device that simultaneously performs NR edge communication and V2X edge communication. In some embodiments, the terminal device may perform only V2X edge communication.

The terminal device may be a communications device in different communication states. For example, the terminal device may be user equipment in an idle state (idle), may be a communications device in an RRC setup process, or may be a terminal device in an inactive state. This is not limited herein.

The terminal device may be in a moving state, or may be in a stationary state. In some embodiments, the terminal device may be in a high-speed motion scenario, and is separately located in coverage regions of a plurality of TN cells in a running process. In some embodiments, a running rate of the terminal device is not negligible relative to movement of a satellite, and the running process may be in coverage ranges of a plurality of NTN moving cells. In some embodiments, the terminal device is stationary relative to the ground, and may be in coverage ranges of different NTN moving cells in a communication process.

The first information may be used by the terminal device to determine the one or more first TN regions related to the terminal device, to optimize a measurement used by the terminal device for cell handover or cell reselection. In other words, the terminal device may measure only cells in the one or more first TN regions, instead of measuring all surrounding cells, thereby reducing power consumption of the device. For example, after determining the first TN region related to the terminal device in the NTN cell, the terminal device may perform a handover from the NTN cell to the TN cell.

In some embodiments, information about some or all TN regions corresponding to the NTN cell in the first information may be beneficial for the terminal device to determine a first TN region around the terminal device. For example, the terminal device may request RRC resume from a cell in the related first TN region based on stored information about the TN region.

The TN region is used to describe a coverage region of a terrestrial network, and may also be referred to as TN coverage or TN deployment. The TN region usually includes a plurality of TN cells. In some embodiments, the TN cell may be a cell served by a network device located on the ground. The TN cell is usually stationary, and a validity period of cell data is longer. In some embodiments, the TN cell may be a cell in which the network device provides a service for a relatively long period of time.

The TN cell in the TN region may be any one of the foregoing cells, such as an urban cell or a micro cell, which is not limited herein.

The first TN region is a TN region related to the terminal device. For example, the first TN region may be a TN region around the terminal device at a current instant. For another example, the first TN region may cover a region through which the terminal device is about to pass. For another example, the first TN region may be a region in which a target TN cell to which the terminal device may perform cell handover or cell reselection is located.

The first TN regions related to the terminal device may be one TN region or multiple TN regions. For example, in a region in which TN regions are densely distributed, a plurality of TN regions may set up RRC connections with the terminal device. These TN regions may have overlapping regions.

A communications device may determine, in a plurality of manners, one or more first TN regions related to the terminal device. In some embodiments, the one or more first TN regions may be determined based on distances between the terminal device and a plurality of TN regions corresponding to the NTN cell. A manner of determining the first TN region is described below with reference to a formula as an example. In some embodiments, the network device may determine, based on geographical region information of the TN region and a motion trajectory of the terminal device, the one or more first TN regions related to the terminal device. In some embodiments, the terminal device may perform a search based on a frequency to determine the first TN region related to the terminal device.

The terminal device may determine, based on the one or more first TN regions, the target TN cell for performing cell handover or cell reselection. For example, after determining the one or more first TN regions related to the terminal device, the terminal device may perform terminal device measurement for cell handover or cell reselection, to determine the target TN cell.

In some embodiments, the terminal device may set up a connection with the target TN cell, to ensure service continuity. For example, the terminal device is handed over from the NTN cell to the target TN cell, so that a transmission delay caused by a long communication distance of the NTN cell can be avoided, and transmission efficiency can be further improved. For example, after determining the target TN cell, the terminal device may prioritize the target TN cell during cell reselection, to improve a transmission effect.

The target TN cell may be a preferred first cell, or may be a plurality of relatively preferred cells. In some embodiments, the target TN cell may be an optimal TN cell determined by the terminal device, to ensure an optimal transmission effect. In some embodiments, the target TN cell may be a plurality of TN cells to select a suitable TN cell based on an actual condition during cell handover or cell reselection. For example, when the optimal TN cell determined by the terminal device based on the measurement is full loaded, the target TN cell may be a sub-optimal TN cell to be handed over to.

The first TN region is a plurality of TN regions corresponding to the NTN cell. The TN region corresponding to the NTN cell is a plurality of TN regions in a coverage range of the NTN cell. In some embodiments, for an NTN moving cell, if a geographical region of the coverage range of the NTN cell changes, a TN region within the coverage range also changes. In some embodiments, for an NTN fixed cell, a TN region within the coverage range of the NTN cell is relatively fixed.

In a possible implementation, the TN region corresponding to the NTN cell may include a TN region within the coverage range at a current instant, or may include a TN region within the coverage range before the current instant, or may include a TN region within the coverage range after the current instant. For example, when the current instant is t, the TN region corresponding to the NTN cell includes a TN region covered at the instant t, a TN region covered at an instant t−n, and/or a TN region covered at an instant t+n.

In some embodiments, TN regions corresponding to the NTN cell may have overlapped regions. For example, in a densely populated urban region, coverage ranges of the TN regions may be the same. In other words, among the coverage ranges of the NTN cell, TN regions in some regions may be relatively concentrated, resulting in overlapping regions.

The first information may include specific information of the TN region corresponding to the NTN cell, so that the terminal device determines a first TN region related to the terminal device. The first information may also be referred to as TN coverage region information, TN coverage information, or TN region information. The information includes one or more of the following: frequency information or a frequency list of the TN region corresponding to the NTN cell, geographical region information of the TN region corresponding to the NTN cell, or geographical region information of each cell in the TN region corresponding to the NTN cell.

In some embodiments, the first information may include the frequency information or the frequency list of the TN region corresponding to the NTN cell. The frequency information or the frequency list may be beneficial for the terminal device to perform measurement. For example, the first information may indicate, by using the frequency list, a frequency used by the TN region. The frequency list may be a frequency list in each TN coverage region, or may be a frequency list corresponding to a plurality of TN regions. For example, when a plurality of TN regions uses a same frequency $f_1$, there may be only one $f_1$ in the frequency list. If the terminal device cannot detect any reference signal based on the frequency $f_1$ within a period of time, it indicates that these TN regions do not cover a location of the terminal device. For another example, the terminal device may search for a cell with a strongest signal based on a frequency in the frequency list.

In some embodiments, the first information may include the geographical region information of the TN region corresponding to the NTN cell. The geographical region information may be used to identify a coverage range of the TN region, so that the terminal device determines whether a specific TN cell is located at a location near the terminal device.

In some embodiments, a manner of indicating the geographical region information of the TN region may be determined based on an actual geographical situation within the coverage range of the TN region.

In a possible implementation, the geographical region information of the TN region may be described by using a center point location and a cell radius of the TN coverage region. In other words, a center location and a radius of a region of the TN coverage range may be represented by center point location information and radius information, respectively. The terminal device may calculate a boundary of the TN region based on the center point location and the radius, to determine whether the terminal device is within the coverage range of the TN region, or is about to enter the coverage range.

In another possible implementation, a geographical region location of the TN region may be described by location information of a boundary line or a boundary point. The terminal device may directly determine, based on a location of the terminal device and location information of boundary lines or boundary points of a plurality of TN regions, the one or more first TN regions related to the terminal device. For example, the geographical region location of the TN region may be represented by a latitude and longitude range.

In some embodiments, the first information may include the geographical region information of each cell in the TN region corresponding to the NTN cell. It may be learned from the foregoing description that the TN region usually includes a plurality of TN cells. The first information may indicate geographical region information of each TN cell in each TN region in a positioning manner of the TN cell. For example, the first information may indicate the geographical region information of each cell by using location information of the network device in the TN region.

In some embodiments, the first information may include a list of the plurality of TN regions corresponding to the NTN cell. For example, the first information may include a TN region list indicated by the geographical region information. For example, the first information may include a TN region list indicated by the frequency information.

In some embodiments, the first information may further include specific information of all TN regions in the NTN cell, so that the terminal device determines all first TN regions related to the terminal device.

It should be noted that the TN region corresponding to the NTN cell in the first information may be some TN regions corresponding to the NTN cell, or may be all TN regions corresponding to the NTN cell. In some embodiments, when the information about the one or more first TN regions related to the terminal device may be determined by using information about a group of TN regions, the first information may include only the information about the group of TN regions. In other words, in a case that the terminal device may determine the related TN region, the first information is unnecessary to include information about all the TN regions corresponding to the NTN cell.

The terminal device may obtain the first information in a plurality of manners. In some embodiments, the first information may be sent by the network device to the terminal device. For example, the network device may send the first information when the terminal device requests to establish an RRC connection. In some embodiments, the first information may be determined in a manner in which the network device performs sending and the terminal device independently performs measurement. For example, the terminal device may receive second information through broadcasting, and then determine third information through independent measurement. In some embodiments, the terminal device may determine the first information only through independent measurement.

For example, the network device may send the first information to the terminal device through broadcasting or through dedicated signalling. In an embodiment, the terminal device may receive some information (for example, the second information) in the first information through broadcasting, and then receive other information (for example, the third information) through dedicated signalling. In an embodiment, the terminal device may receive the second information through broadcasting, and then determine the third information in a manner of a combination of dedicated signalling and independent measurement. In an embodiment, the terminal device may receive the first information only through dedicated signalling.

The network device may be a communications device that provides a service on an NTN network side. In some embodiments, the network device may be a base station in the NTN system that provides a service through a satellite. For example, the network device may be a satellite. In some embodiments, the network device may be a non-satellite mobile network device. For example, the network device is a base station installed on a low-altitude aircraft.

The network device may provide a service for the terminal device in a plurality of scenarios. In some embodiments, the network device may provide a service for the terminal device at a current instant. The terminal device may obtain the first information through communication with the network device. In some embodiments, the network device may be a communications device that has provided a service for the terminal device. The terminal device stores the first information sent by the network device, to subsequently determine the target TN cell. In some embodiments, the network device may be a base station for which the terminal device is setting up an RRC connection.

The network device may be a communications device that moves relative to the terminal device. Due to movement of the network device and/or the terminal device, the terminal device is required to perform cell handover or cell reselection. In some embodiments, a network device of a moving cell is deployed on a satellite. Regardless of whether the terminal device is stationary or a speed can be ignored, the satellite and the terminal device are both moving relative to each other. In some embodiments, if a moving rate of the terminal device is very high or the moving rate of the terminal device cannot be ignored for a V2X-based service, information about a cell around the terminal device is frequently updated.

The network device may determine the first information in a plurality of manners. In some embodiments, because a motion trajectory of the satellite is predictable, a TN region included in an NTN moving cell is also predictable. The network device may determine the first information based on a predicted trajectory. In some embodiments, when the network device is deployed on the satellite, distribution of TN regions may be determined through communication with a terrestrial core network, to determine the first information.

The network device may send the first information to the terminal device in a plurality of manners. In some embodiments, the NTN moving cell may broadcast the first information based on the predicted trajectory. In some embodiments, the NTN moving cell may send the first information in combination with broadcasting and dedicated signalling to more accurately notify the terminal device of the coverage range of the TN region. In some embodiments, the NTN moving cell may send the first information based on location information of the terminal device through dedicated signalling.

When the first information is sent through a broadcast message, an existing system information block (SIB) may be used to carry the information, or a new SIB may be set up to carry the information. For example, the network device may use a signalling structure in an existing SIB4 to carry the first information. The SIB4 may include a frequency list and a TN coverage region list. To minimize overheads, the network device may define a TN coverage region in a separate information element (IE).

In an embodiment, the network device may send the first information only through a broadcast message. The first information may be determined based on a current coverage range. For example, the network device broadcasts, at different instants, TN regions corresponding to the instants. For example, at an instant T1, the NTN moving cell covers a TN region 1 and a TN region 2, and the TN region 1 and the TN region 2 are broadcast; at an instant T2, the NTN moving cell covers the TN region 2 and a TN region 3, and the TN region 2 and the TN region 3 are broadcast; and at an instant T3, the NTN moving cell covers the TN region 3, and the TN region 3 is broadcast.

In an implementation process of the foregoing embodiment, in a time period from T1 to T3, due to a change of the TN region within the coverage range, the NTN cell is required to trigger two system information (SI) modification processes. For example, when the network device sends TN regions at different instants through the SIB in the broadcast message, the terminal device is required to frequently update system information to determine a TN region actually covered by the NTN cell.

In an embodiment, the network device may send the first information only through a broadcast message. The first information may further include a predicted TN region. For example, the network device may predict and determine specific information of the TN cell by using information such as a motion trajectory and a motion direction, and generate the first information. The first information in the broadcast message includes not only a TN region covered by the NTN cell at a current instant, but also a TN region covered by the NTN cell before the current instant and/or a TN region covered by the NTN cell after the current instant. Therefore, the network device broadcasts more TN regions than TN regions in a current coverage range of the NTN cell, and in this case, the terminal device is unnecessary to frequently update S1 information.

For example, n TN regions are covered by the NTN moving cell: a TN region 1, a TN region 2, . . . , and a TN region n. Based on a moving speed of the NTN, while a low-speed moving rate of the terminal device may be ignored, the first information in the broadcast message may include different content. Optionally, at an instant t, a terminal device in the coverage region broadcasts a region that has been covered previously and a region that is being covered. Optionally, at the instant t, the terminal device in the coverage region broadcasts the region that is being covered and a region that is to be covered based on a prediction result.

The foregoing three instants are still used as examples. At the instant T1, the NTN moving cell covers the TN region 1 and the TN region 2, and the TN region 1, the TN region 2, and the TN region 3 (a region to be covered) are broadcast; at the instant T2, the NTN moving cell covers the TN region 2 and the TN region 3, and the TN region 1 (a region that has been covered previously), the TN region 2, and the TN region 3 are broadcast; and at the instant T3, the NTN moving cell covers the TN region 3, and the TN region 1 (a region that has been covered previously), the TN region 2 (a region that has been covered previously), and the TN region 3 are broadcast.

It can be learned from the implementation process of the foregoing embodiment that, in a time period from T1 to T3, content in the broadcast first information remains unchanged, modification is unnecessary to be triggered, and the terminal device is not required to frequently update system information.

In an embodiment, the network device may send the first information in a manner of combining a broadcast message with dedicated signalling, to reduce problems of excessive signalling overheads in the foregoing two embodiments. It can be learned from the foregoing description that an actual quantity of TN regions within a coverage range of a complete NTN cell may be very large. If only broadcast signalling is used to provide data of the TN region, signalling overheads are very high. For example, signalling overheads of frequency information involved in a coverage information list of each TN coverage region are relatively high. Further, more accurate TN region data provided for the terminal device leads to a higher success rate of performing NTN-TN cell handover or cell reselection by the terminal device. Therefore, to improve data accuracy, an amount of information in the first information may be very large, which causes a sharp increase in overheads of broadcast signalling.

Because a validity period of the TN region data is very long, a network is unnecessary to frequently update related data of the TN region. Therefore, in this embodiment, when the broadcast message is used in combination with dedicated signalling for the terminal device, the dedicated signalling may carry more overheads, so that overheads of the broadcast signalling are reduced.

In an implementation, the dedicated signalling for the terminal device may be dedicated RRC signalling, dedicated non access stratum (NAS) signalling, or other dedicated signalling, which is not limited herein.

When the broadcast message is used in combination with dedicated signalling, content in the first information may be represented by a plurality of pieces of information, so that the terminal device accurately determines information about a nearby TN region or a terrestrial network device (for example, a base station) while reducing the overheads of the broadcast signalling.

In some embodiments, the first information may include second information and third information. The second information may be related to the TN region corresponding to the NTN cell, and the third information may be related to one or more first TN regions for determining the target TN cell. In other words, the second information may include brief information or general information of some or all TN regions corresponding to the NTN cell. The third information may include specific information of the first TN region related to the terminal device. For example, the network device may send center location coordinates and radii of a plurality of first TN regions to the terminal device.

In a possible implementation, the second information may include frequency information/a frequency list of the TN region covered by the NTN cell. The second information may further include geographical region information of a cell list in coverage regions (which may overlap) of the NTN cell. The second information may further include a frequency list corresponding to each TN coverage region. Each TN coverage region is intended to describe a group of cells, not only a single cell. For example, center location coordinates and a radius may be used to define each TN coverage region.

In a possible implementation, the third information may alternatively be determined based on a TN region in the NTN cell and an actual situation of the terminal device. For example, when there are many TN regions, and a moving rate of the terminal device cannot be ignored, the third information may further include relative motion information of the satellite and the terminal device, so that the terminal device more accurately predicts information about a nearby first TN region or a terrestrial network device with reference to the two pieces of information. For another example, during prediction of the first TN region, moving speeds of the terminal device and the satellite may be considered at the same time.

In a possible implementation, the third information may further include fourth information or fifth information, and the fourth information and the fifth information are separately sent through different dedicated signalling.

In a possible implementation, content of the second information and content of the third information may be adjusted based on a sending manner. For example, the second information may include the frequency list of the TN region in the NTN cell, and the third information may include specific frequency information involved in a coverage information list of each TN coverage region.

In a case that the first information includes the second information and the third information, the network device may respectively send the two pieces of information through a broadcast message and dedicated signalling.

For example, the second information may be carried in a broadcast message. For example, the frequency information/frequency list of the TN region covered by the NTN cell may be broadcast through broadcast signalling. For another example, corresponding geographical region information may be provided via broadcast signalling of (possibly overlapping) region lists through the network. For another example, broadcast signalling is used to broadcast a frequency list corresponding to each TN coverage region of a group of cells.

For example, the third information may be carried in dedicated signalling. For example, RRC signalling may be used to send center location coordinates and a radius of a single cell corresponding to each frequency, so that the terminal device defines center location coordinates and radius information of each cell in each region.

In a possible implementation, in a case that the third information is carried in dedicated signalling, the network device may send the third information on different occasions based on different status of the terminal device. Example descriptions are provided below with reference to FIG. 5 to FIG. 9.

For example, the third information may be determined by the terminal device based on a measurement result. Descriptions are provided below with reference to measurement.

For example, the third information may alternatively be determined with reference to dedicated signalling and a measurement result of the terminal device. For example, the network device may send predicted information about a plurality of TN regions that may be related to the terminal device to the terminal device through dedicated signalling, and the terminal device refines these TN regions through measurement or the like, and finally determines the third information that includes one or more first TN regions. Further, the terminal device may determine, based on the first TN region in the third information, the target TN cell for cell handover.

In some embodiments, the first information may include the second information and/or the third information, the second information is carried in a broadcast message, and the third information is carried in dedicated signalling and/or is determined by the terminal device based on a measurement result. Optionally, the first information may include only the second information, and the first information is the second information and is carried in a broadcast message. Optionally, the first information may include only the third information, and the first information is the third information and is carried in dedicated signalling. Optionally, the first information may include only the third information, and the first information is the third information and is determined by the terminal device based on a measurement result. Optionally, the first information may include only the third information, and the first information is the third information and is determined through dedicated signalling and a measurement result of the terminal device. Optionally, the first information includes the second information and the third information, and the second information and the third information are determined in different manners.

It may be learned from FIG. 4 that in the method in embodiments of the present application, corresponding geographical region information may be provided via broadcast signalling of (possibly overlapping) region lists through the network, and specific information of the TN region is further provided by adding useful additional information to the dedicated signalling. In this method, when a cell coverage range is large and the network device and the terminal device are moving relative to each other, measurement used by the terminal device for cell handover or cell reselection is optimized. Further, problems regarding a manner in which an NTN network notifies the terminal device of a coverage situation of the TN region in the NTN region and whether the terminal device can be accurately notified are resolved, to ensure that the terminal device is aware of a TN coverage region or base station information, thereby ensuring service continuity.

As mentioned above, in some scenarios, the moving rate of the terminal device cannot be ignored, for example, when the terminal device moves at a high speed, or when the terminal device performs a V2X service, or when the terminal device performs NR edge communication. In these scenarios, during prediction of the TN region related to the terminal device, both a moving speed of the NTN and the moving rate of the terminal device need to be considered.

In some embodiments, the communications device may predict a first TN region near the terminal device based on the motion trajectory of the terminal device, so that the NTN network more specifically notifies the terminal device of specific coverage information of the first TN region through RRC or NAS dedicated signalling.

For example, the network device may determine a location of the terminal device at a specific instant based on a prediction and a navigation trajectory of the terminal device, so that the network device sends information about a related TN region. For example, the navigation trajectory of the terminal device may be determined based on a global navigation satellite system (GNSS) or another navigation route. For another example, the terminal device may report the navigation trajectory of the terminal device to the NTN network. For another example, the NTN network may autonomously locate and predict a motion route of the terminal device.

In a case that the moving rate of the terminal device is ignorable, as the terminal device moves, a distance between the terminal device and the TN region changes. In some embodiments, the one or more first TN regions related to the terminal device may be determined based on distances between the terminal device and the plurality of TN regions corresponding to the NTN cell.

For example, information about a specific base station in a coverage region or a TN region of a TN around the terminal device at a specific location may be predicted by using center location coordinates of the plurality of TN regions. For example, when the NTN cell corresponds to M TN regions (M is a natural number greater than 1), if a location of the terminal device at a specific instant is represented as $P_u(X_u, y_u)$, and center location coordinates of a $j^{th}$ TN region in the M TN regions are represented as $(x_j, y_j)$, a distance $Z_j$ between the terminal device and a center of the $j^{th}$ TN region may be represented as:

$$Z_j = \sqrt{(x_j - x_u)^2 + (y_j - y_u)^2}.$$

For example, in the plurality of TN regions corresponding to the NTN cell, the first TN region may be determined based on a distance threshold. For example, the first TN region may be determined based on a first distance threshold. The first distance threshold may be a distance threshold $Z_{target}$ that is set by the NTN network for the first TN region. For another example, the first TN region may be determined based on the first distance threshold and a coefficient related to the first distance threshold.

For example, the coefficient of the first distance threshold may include a first coefficient $\alpha$ and a second coefficient $\beta$, and distances $Z_j$ between the terminal device and the N TN regions meet the following condition: $\alpha \times Z_{target} \leq Z_j \leq \beta \times Z_{target}$.

For example, $\alpha$ and $\beta$ may be different percentages, for example, 100%, 80%, 70%, or 60%.

For example, the system may configure the two coefficients of the first distance threshold. For example, the two coefficients may be configured based on a size of density covered by the TN region. Higher density covered by the TN region leads to a smaller interval for selection of $Z_j$.

In an implementation, the NTN network may notify the terminal device of the region $Z_j$ of the TN region through RRC signalling.

In some embodiments, the communications device may predict, based on a deviation angle/included angle between the moving trajectory of the terminal device and the satellite, an occasion on which the terminal device performs cell handover or cell reselection, so that the terminal device is handed over to a terrestrial station on a proper occasion. For example, the moving trajectory of the terminal device and an included angle between the moving trajectory of the terminal device and a running trajectory of the satellite can facilitate the terminal device in determining an occasion to an edge of the NTN cell.

For example, the terminal device may perform measurement for cell handover or reselection at a cell boundary. A boundary used by the terminal device to determine a handover or reselection occasion is referred to as a first boundary. Within the coverage range of the NTN cell, the first boundary at which the terminal device performs cell handover or cell reselection may be an edge of the NTN cell, or may be a boundary between the NTN cell and the TN region corresponding to the NTN cell. For example, the terminal device may perform NTN-TN cell handover at a boundary between the NTN cell and the first TN region.

For example, when the moving rate of the terminal device cannot be ignored, the occasion on which the terminal device performs cell handover or cell reselection may be determined based on a running parameter of the terminal device and/or a running parameter of the satellite in the NTN cell.

For example, the running parameter of the terminal device or the satellite may include a moving speed and a motion trajectory. The motion trajectory may refer to a running direction of a device. The motion trajectory of the terminal device and the motion trajectory of the satellite may be used to determine an included angle between the moving trajectories of the two devices.

For these running parameters, the moving speed may be used to determine a distance between the terminal device and the first boundary, and the motion trajectory may also be used to determine the distance between the terminal device and the first boundary. For example, the moving speeds of the terminal device and the satellite and the included angle between the terminal device and the satellite may be used by the communications device to predict the distance between the terminal device and the first boundary, to determine a handover occasion.

For example, it is assumed that the moving speed of the terminal device is $V_u$, the moving speed of the satellite is $V_t$, an included angle between $V_u$ and $V_t$ is $\partial$, a distance between the terminal device and a first boundary that is the closest to the terminal device in a direction of the motion trajectory of the terminal device at a current instant is $D_1$, and a distance between the terminal device and a first boundary that is the closest to the terminal device in a direction perpendicular to the moving trajectory of the terminal device at the current instant is $D_2$. Based on these assumptions, considering that the NTN satellite and the terminal device move along their respective trajectories, running time in the two directions $D_1$ and $D_2$ is $t_1$ and $t_2$, respectively. $t_1$ and $t_2$ may be respectively represented as follows:

$$t_1 = \frac{D_1}{V_u - V_t \cos\partial},$$

$$t_2 = \frac{D_2}{V_t \sin\partial},$$

where $\sin \partial$ is not 0.

Further, it is assumed that cell handover or cell reselection from the terminal device to the terrestrial station is started after a time period T starting from the current instant. In other words, the occasion on which the terminal device performs cell handover or cell reselection is represented by a first time period T starting from the current instant, and the first time period T may be represented by:

$$T = \min(t_1, t_2) - t,$$

where t represents time used by the terminal device to perform cell handover or cell reselection. For example, t may be determined based on a length of a T300 timer used by the terminal device to perform a connection request, for example, may be 600 ms, or t may be an average reference value that is set by the NTN network based on experience.

In some embodiments, the target TN cell and the handover occasion may be determined based on the running parameters of the terminal device and the satellite. For example, a location $P_u$ of the terminal device after the time period T may be determined based on the running parameters, and then the target TN cell is determined based on a plurality of distances $Z_i$ between the location and a plurality of first TN regions.

As mentioned above, the third information may be carried in dedicated signalling, or may be determined based on a measurement result of the terminal device. When the third information is carried in dedicated signalling, the network device may determine, based on a status of the terminal device, an occasion for sending the third information. The terminal device may store the third information, to facilitate subsequent cell reselection or cell handover.

It should be noted that the first information may also be carried in dedicated signalling. Therefore, information in the dedicated signalling may be specific coverage information of all TN regions, or may include only specific information of the first TN region. For differentiation, in the following embodiments, TN region information is used to represent the foregoing third information or the foregoing first information.

In a possible implementation, for a quasi-Earth moving cell, if a coverage range of the NTN is updated, RRC dedicated signalling also varies based on a status of the terminal device.

For example, an RRC connection procedure includes processes such as RRC connection setup, reconfiguration, release, and reconstruction between the terminal device and the network device (for example, a gNodeB). The third information may be separately carried in one of the following dedicated signalling based on different status: RRC setup signalling received by the terminal device, RRC connection reconfiguration signalling received by the terminal device, capability enquiry signalling received by the terminal device, or RRC resume signalling received by the terminal device.

It should be noted that when the first information is carried in dedicated signalling, for the signalling that carries the first information, reference may also be made to the dedicated signalling corresponding to the third information. Details are not described herein again.

For example, the terminal device may be in an RRC setup process, may be in an RRC idle state, or may be in an inactive state. For ease of understanding, dedicated signalling in different status is separately described below by using examples with reference to FIG. 5 to FIG. 9. In three embodiments shown in FIG. 5 to FIG. 7, the terminal device receives TN region information (the third information or the first information) in an RRC setup process or an RRC idle state through dedicated signalling, and in two embodiments of FIG. 8 and FIG. 9, the terminal device receives TN cell information in an inactive state through dedicated signalling.

In the RRC setup process, the network device may notify the terminal device of related information, and the terminal device stores the information.

In an embodiment, in RRC setup signalling, the NTN network sends information about a covered TN region to the terminal device, and the terminal device stores coverage information of a neighboring TN cell from the network. This is specifically shown in FIG. 5. The information may relate to center location coordinates and a radius of a single cell corresponding to each frequency, to define center location coordinates and radius information of each cell in each region.

As shown in FIG. 5, in Step S510, the terminal device sends an RRC setup request (RRCSetupRequest) message to the network device. In initial random access (RA), the RRCSetupRequest message is transmitted through a message 3 (Msg3). An RRC setup cause and an identity of the terminal device are carried in the RRCSetupRequest message. The network device establishes context for the terminal device, and performs signalling radio bearer 1 (SIB1) resource admission and resource allocation.

In Step S520, the network device replies to the terminal device with an RRC setup (RRCSetup) response message. The message may also be referred to as RRC setup signalling. Detailed information about SRB1 resource configuration and TN region information are carried in the message.

In Step S530, the terminal device performs radio resource configuration based on SRB1 resource information indicated by the RRCSetup message, and sends an RRC setup complete (RRCSetupComplete) message to the network device. The RRC setup complete message carries a selected public land mobile network (PLMN) identity (selectedPLMN-Identity), a registered AMF (registeredAMF), a single network slice selection assistance information (SNSSAI) list (snssai-list), and the like. In this case, RRC connection setup is completed. After the network device transparently transmits a NAS direct transmission message between the terminal device and the AMF, identity query, authentication, a NAS security mode, a registration process, and the like are completed.

In Step S540, the terminal device stores information about a TN cell. A sequence of Step S530 and Step S540 is not limited.

In an embodiment, in RRC connection reconfiguration signalling, the NTN network device sends information about a covered TN region to the terminal device, and the terminal device stores coverage information of a neighboring TN region from the network. This is specifically shown in FIG. 5. The information may relate to center location coordinates and a radius of a single cell corresponding to each frequency, to define center location coordinates and radius information of each cell in each region.

As shown in FIG. 6, in Step S610, the network device delivers an RRC connection reconfiguration (RRCReconfiguration) message to the terminal device to instruct to establish an SRB2 and a data radio bearer (DRB), and carries TN region information in the message. The message may also be referred to as RRC connection reconfiguration signalling.

In Step S620, after receiving the RRCReconfiguration message, the terminal device starts to establish the SRB2 and the DRB. After the SRB2 and the DRB are successfully established, the terminal device replies to the network device with an RRC connection reconfiguration complete (RRCReconfigurationComplete) message indicating that reconfiguration is completed.

In Step S630, the terminal device stores the TN region information. A sequence of Step S630 and Step S620 is not limited.

In an embodiment, capability enquiry information of the terminal device may include information about a covered IN region that is sent by the NTN network device to the terminal device, and the terminal device stores coverage information of a neighboring TN region from the network. This is specifically shown in FIG. 5. The information may relate to center location coordinates and a radius of a single cell corresponding to each frequency, to define center location coordinates and radius information of each cell in each region.

As shown in FIG. 7, in Step 710, capability enquiry for the terminal device is performed between the terminal device and the network device. In this procedure, the network device sends a capability enquiry (UECapabilityEnquiry) message to the terminal device, and a message for initiating capability enquiry may carry TN cell information. The message may also be referred to as capability enquiry signalling. The terminal device replies to the network device with UECapabilityInformation that carries capability information of the terminal device. The network device sends a terminal device radio capability information indication (UE RADIO CAPABILITY INFO INDICATION) message to an AMF, and transparently transmits a capability of the terminal device.

In Step S720, the terminal device stores the TN cell information. A sequence of Step S720 and a procedure in which the terminal device replies with the capability information is not limited.

When RRC of the terminal device is in an inactive state, and the terminal device is resumed from an RRC_INACTIVE state, an inactive radio network temporary identifier (I-RNTI) may be determined based on a last serving NTN network. If an identifier of the NTN network can be obtained through parsing from the I-RNTI, context data provided by the last serving NTN network may be directly requested, to complete an RRC connection resume procedure.

In an embodiment, when the NTN network sends RRC resume signalling to the terminal device, the RRC resume signalling may carry TN region information, and the terminal device stores the TN region information. This is specifically shown in FIG. 8.

Figures 8, 9, 10, 11:
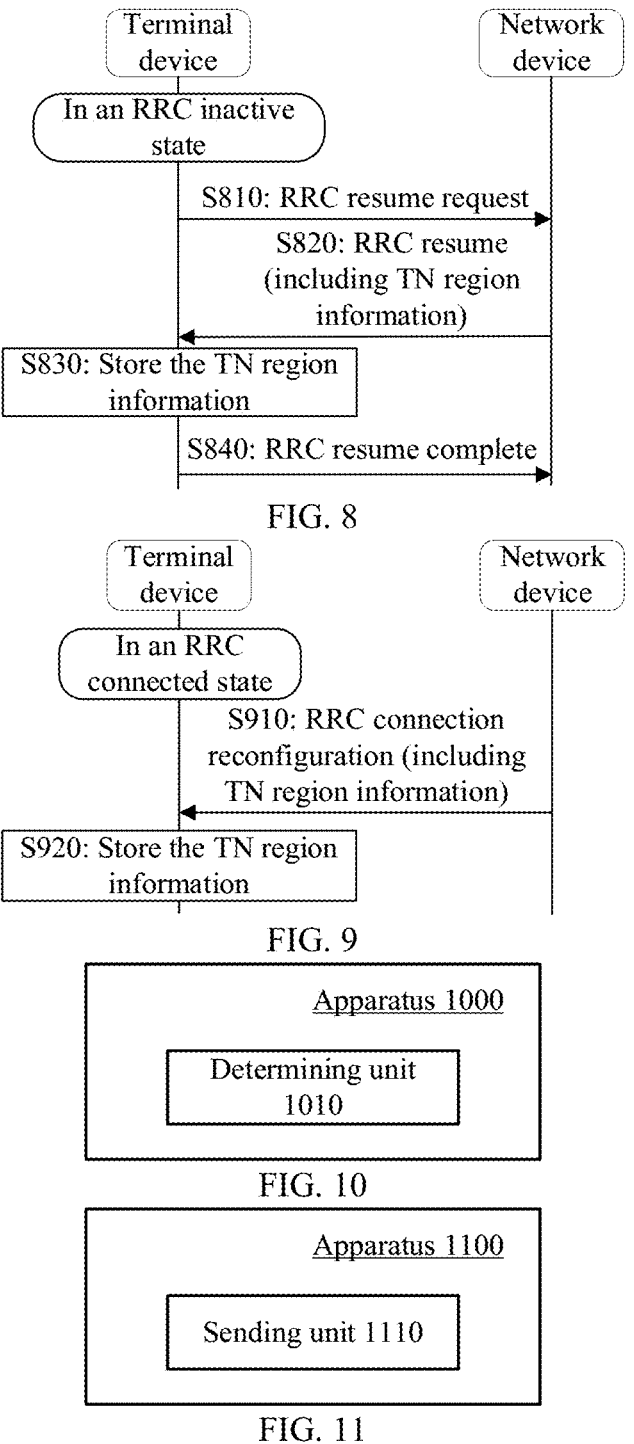
FIG. 8 is a schematic flowchart of still another possible implementation according to an embodiment of the present application.
FIG. 9 is a schematic flowchart of still another possible implementation according to an embodiment of the present application.
FIG. 10 is a schematic structural diagram of an apparatus for wireless communication according to an embodiment of the present application.
FIG. 11 is a schematic structural diagram of another apparatus for wireless communication according to an embodiment of the present application.

As shown in FIG. 8, the terminal device is in an RRC inactive state.

In Step S810, the terminal device sends an RRC resume request (RRCResumeRequest) to the network device.

In Step S820, the network device replies to the terminal device with RRC resume (RRCResume) message, where the message carries the TN region information. The message may also be referred to as RRC resume signalling.

In Step S830, the terminal device stores the TN region information.

In Step S840, the terminal device sends an RRC resume complete (RRCResumeComplete) message to the network device.

In an embodiment, after RRC connection setup is completed, the TN region information may be carried in a subsequent RRC connection reconfiguration message (RRC connection reconfiguration signalling), and the terminal device stores the TN region information. For details, refer to FIG. 9.

As shown in FIG. 9, the terminal device is in an RRC connected state.

In Step S910, the network device delivers RRC connection reconfiguration signalling to the terminal device that carries TN region information.

In Step S920, the terminal device stores the TN region information.

A plurality of implementations in which the network device sends the TN cell information (the third information or the first information) to the terminal device are described above with reference to FIG. 5 to FIG. 9. It may be learned from the foregoing description that the third information may alternatively be determined by the terminal device based on a measurement result. In other words, the terminal device may determine the first TN region and the target TN cell through independent measurement. Example description is provided below with reference to a measurement process of the terminal device.

In some embodiments, measurement of a TN frequency may be optimized based on whether the terminal device is in a coverage range of a TN region. For example, for the terminal device, in addition to receiving the TN coverage data provided by the NTN network device as shown in FIG. 5 to FIG. 9, the terminal device may further detect whether the TN region exists, and further refine the first TN region and a region covered by the TN region, to get ready for subsequent cell handover or cell reselection. For example, when the NTN network device configures a plurality of TN coverage regions for the terminal device, the terminal device may further determine, through independent auxiliary measurement, a first TN region to be measured by the terminal device.

In an implementation, the terminal device sweeps all carrier frequencies on a standard supported by the terminal device, and searches for a suitable cell, that is, the target TN cell. On each carrier frequency, the terminal device searches only for a cell with a strongest signal, and camps on a target TN cell that is found first. In a case that the terminal device is moving at a high speed, regardless of whether the NTN provides the TN region through broadcasting, through RRC dedicated signalling, or a combination thereof, there is a large deviation in the provided TN region. In this scenario, it is more important that the terminal device independently determines the TN region.

For example, the terminal device may not be able to detect any reference signal from a TN frequency within a period of time. Actually, there is probably no TN region at a location of the terminal device. In this case, the terminal device may relax measurement of the TN frequency or stop measurement of the TN frequency.

For another example, if the network does not provide TN region data or the provided TN region data is ambiguous, the terminal device may independently detect TN region information. When the terminal device detects that there is no TN region nearby, the terminal device is unnecessary to perform TN neighboring cell measurement. When the TN region is nearby, the terminal device may consider measuring a TN neighboring cell based on quality of a serving cell. To determine whether the TN region is nearby, the terminal device is required to compare distances from the terminal device to TN reference locations with a specific distance threshold. Because the TN region may be signalled by using center location coordinates and a radius of a region, the two parameters may be used as a reference location and a distance threshold to determine a distance from the terminal device to the TN region.

For another example, the terminal device may determine priorities of different frequencies by using a communication status. For example, when the terminal device simultaneously performs NR edge communication and V2X edge communication, it may be considered that a frequency for providing both NR edge communication and V2X edge communication is a highest priority. For another example, if the terminal device is configured to perform only V2X edge communication, it may be considered that a frequency for providing V2X communication is a highest priority.

For example, in a V2X or high-speed motion scenario, the terminal device may further determine specific coverage information of a base station in a same/different TN regions based on a plurality of TN regions notified by the NTN, to get ready for NTN-TN handover. In other words, the target TN cell may be determined based on a measurement result obtained after the terminal device measures at least one first TN region.

In an implementation, when the third information is determined by the terminal device based on the measurement result, the measurement result may include transmit power of a network device corresponding to one or more first TN regions measured by the terminal device. Each first TN region in the one or more first TN regions may correspond to a plurality of network devices. $P_i$ is set as transmit power of a terrestrial station $S_i$ in a specific TN region or transmit power of an $i^{th}$ network device corresponding to the TN region. Values of transmit power of a plurality of terrestrial stations measured by the terminal device at a location $P_u$ are $P_1, \ldots,$ and $P_n$, respectively.

For example, the target TN cell is further determined based on relative distances between the terminal device and a plurality of network devices corresponding to the one or more first TN regions, and/or load status of the plurality of network devices corresponding to the one or more first TN regions.

For example, when each first TN region in the one or more first TN regions corresponds to N network devices, the target TN cell may be determined based on first parameters of the N network devices corresponding to each first TN region in the one or more first TN regions. In each first TN region, the first parameter may comprehensively consider transmit power measured by the terminal device, a distance between the terminal device and the network device, and a load status of the network device.

For example, a first parameter $Q_{pu,i}$ of an $i^{th}$ network device in the N network devices may be represented as:

$$Q_{pu,i} = P_i * \left(1 - \frac{Z_i}{R_i}\right) * (1 - L_i),$$

where $P_i$ represents transmit power of the $i^{th}$ network device, i is a natural number from 0 to N−1, $Z_i$ represents a distance between the terminal device and a center point of the $i^{th}$ network device, $R_i$ represents a distance from the center point of the $i^{th}$ network device to an edge of a service area, $L_i$ represents load saturation of the $i^{th}$ network device, and a value range of $L_i$ is [0, 1].

It should be noted that, in the foregoing formula, $P_i$ may also represent transmit power of an $i^{th}$ terrestrial station in the N terrestrial stations in the TN region, $R_i$ also represents a distance from a center point of a terrestrial station $S_i$ to an edge of the terrestrial station, and when a value of $L_i$ is 0, it indicates there is no load, and when the value is 1, it indicates full load.

A suitable target TN cell may be selected for the terminal device based on the foregoing first parameter, or the foregoing first parameter may be used to determine a network device in a TN region entered by the terminal device. For example, a base station that provides a service for the terminal device may be determined, to determine the target TN cell to which the terminal device performs cell handover or cell reselection.

For example, a network device corresponding to the target TN cell to which the terminal device performs cell handover or cell reselection may be a network device with a largest first parameter in a plurality of network devices. Therefore, a first parameter $Q_{pu}$ of the network device corresponding to the target TN cell meets the following condition:

$$Q_{ou} = \max\{Q_{pu,i}\}_{i=0,1,\ldots,N-1}.$$

For example, the target TN cell for which the terminal device performs cell handover or cell reselection may be a plurality of TN cells. Therefore, the network device corresponding to the target TN cell may also be several network devices with relatively large first parameters, so that a most suitable target TN cell and a corresponding network device are selected based on an actual situation. For example, the plurality of network devices may be sorted sequentially based on first parameters, and network devices corresponding to top five first parameters may be a list of network devices for the terminal device near the TN region.

The method embodiments of the present application are described in detail above with reference to FIG. 1 to FIG. 9. The apparatus embodiments of the present application are described in detail below with reference to FIG. 10 to FIG. 12. It should be understood that the description of the apparatus embodiments corresponds to the description of the method embodiments. Therefore, for parts that are not described in detail, reference may be made to the foregoing method embodiments.

FIG. 10 is a schematic block diagram of an apparatus for wireless communication according to an embodiment of the present application. The apparatus 1000 may be any terminal device described above. The terminal device 1000 shown in FIG. 10 includes a determining unit 1010.

The determining unit 1010 may be configured to determine, based on first information, one or more first TN regions in an NTN cell that are related to the terminal device, where the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

Optionally, the first information includes the second information and/or the third information, the second information is carried in a broadcast message, the third information is carried in dedicated signalling, and/or the third information is determined by the terminal device based on a measurement result.

Optionally, the first information includes the second information and the third information, the second information is related to the TN region corresponding to the NTN cell, and the third information is related to the first TN region.

Optionally, in a case that the third information is carried in dedicated signalling, the dedicated signalling includes RRC signalling or NAS signalling.

Optionally, the third information is carried in one of the following dedicated signalling: RRC setup signalling received by the terminal device, RRC connection reconfiguration signalling received by the terminal device, capability enquiry signalling received by the terminal device, or RRC resume signalling received by the terminal device.

Optionally, in a case that the third information is determined by the terminal device based on the measurement result, the measurement result includes transmit power of a network device corresponding to one or more first TN regions measured by the terminal device.

Optionally, the target TN cell is further determined based on relative distances between the terminal device and a plurality of network devices corresponding to the one or more first TN regions, and/or load status of the plurality of network devices corresponding to the one or more first TN regions.

Optionally, each first TN region in the one or more first TN regions corresponds to N network devices, N is a natural number greater than 1, the target TN cell is determined based on first parameters of the N network devices corresponding to each first TN region, and a first parameter $Q_{pu,i}$ of an $i^{th}$ network device in the N network devices is represented as:

$$Q_{pu,i} = P_i * \left(1 - \frac{Z_i}{R_i}\right) * (1 - L_i),$$

where $P_i$ represents transmit power of the $i^{th}$ network device, i is a natural number from 0 to N−1, $Z_i$ represents a distance between the terminal device and a center point of the $i^{th}$ network device, $R_i$ represents a distance from the center point of the $i^{th}$ network device to an edge of a service area, $L_i$ represents load saturation of the $i^{th}$ network device, and a value range of $L_i$ is [0, 1].

Optionally, the TN region corresponding to the NTN cell includes a TN region covered by the NTN cell at a current instant, and the TN region corresponding to the NTN cell further includes a TN region covered by the NTN cell before the current instant and/or a TN region covered by the NTN cell after the current instant.

Optionally, the one or more first TN regions are determined based on distances between the terminal device and a plurality of TN regions corresponding to the NTN cell.

Optionally, the one or more first TN regions are further determined based on a first distance threshold and/or a coefficient related to the first distance threshold.

Optionally, the coefficient of the first distance threshold includes a first coefficient $\alpha$ and a second coefficient $\beta$, the NTN cell corresponds to M TN regions, and a $j^{th}$ TN region in the M TN regions is the first TN region when a distance $Z_j$ between the terminal device and the $j^{th}$ TN region meets the following condition:

$$\alpha \times Z_{target} \le Z_j \le \beta \times Z_{target},$$

where $Z_{target}$ represents the first distance threshold, and j is a natural number from 0 to M−1.

Optionally, an occasion on which the terminal device performs cell handover or cell reselection is determined based on a running parameter of the terminal device and/or a satellite in the NTN cell.

Optionally, the running parameter includes a moving speed and a motion trajectory, a motion trajectory of the terminal device and/or the satellite is used to determine a distance between the terminal device and a first boundary, and the first boundary includes one of the following boundaries: an edge of the NTN cell; or a boundary between the NTN cell and a TN region corresponding to the NTN cell, where geographical region information of the TN region is represented by a center location and a radius of the TN region.

Optionally, an occasion on which the terminal device performs cell handover or cell reselection is represented by a first time period T starting from the current instant, and the first time period T is represented by:

$$T = \min(t_1, t_2) - t,$$

where t represents time used by the terminal device to perform the cell handover or the cell reselection;

$$t_1 = \frac{D_1}{V_u - V_t \cos\partial},$$

$D_1$ represents a distance between the terminal device and a closest first boundary in a direction along the motion trajectory of the terminal device, $V_u$ represents a moving speed of the terminal device, $V_t$ represents a moving speed of the satellite, and $\partial$ represents an included angle between $V_u$ and $V_t$; and $$t_2 = \frac{D_2}{V_t \sin\partial},$$

$D_2$ represents a distance between the terminal device and a closest first boundary in a direction perpendicular to the motion trajectory of the terminal device, and sin $\partial$ is not 0.

FIG. 11 is a schematic block diagram of another apparatus for wireless communication according to an embodiment of the present application. The apparatus 1100 may be any network device described above. The apparatus 1100 shown in FIG. 11 includes a sending unit 1110.

The sending unit 1110 may be configured to send first information to a terminal device, where the first information is used to determine one or more first TN regions in an NTN cell that are related to the terminal device, the one or more first TN regions are used by the terminal device to determine a target TN cell for cell handover or cell reselection, and the first information includes one or more of the following: frequency information or a frequency list of a TN region corresponding to the NTN cell, geographical region information of a TN region corresponding to the NTN cell, or geographical region information of each cell in a TN region corresponding to the NTN cell.

Optionally, the first information includes the second information and/or the third information, the second information is carried in a broadcast message, the third information is carried in dedicated signalling, and/or the third information is determined by the terminal device based on a measurement result.

Optionally, the first information includes the second information and the third information, the second information is related to the TN region corresponding to the NTN cell, and the third information is related to the first TN region.

Optionally, in a case that the third information is carried in dedicated signalling, the dedicated signalling includes RRC signalling or NAS signalling.

Optionally, the third information is carried in one of the following dedicated signalling: RRC setup signalling received by the terminal device, RRC connection reconfiguration signalling received by the terminal device, capability enquiry signalling received by the terminal device, or RRC resume signalling received by the terminal device.

Optionally, the first information is carried in a broadcast message, the TN region corresponding to the NTN cell includes a TN region covered by the NTN cell at a current instant, and the TN region corresponding to the NTN cell further includes a TN region covered by the NTN cell before the current instant and/or a TN region covered by the NTN cell after the current instant.

Optionally, the one or more first TN regions are determined based on distances between the terminal device and a plurality of TN regions corresponding to the NTN cell.

Optionally, the one or more first TN regions are further determined based on a first distance threshold and/or a coefficient related to the first distance threshold.

Optionally, the coefficient of the first distance threshold includes a first coefficient $\alpha$ and a second coefficient $\beta$, the NTN cell corresponds to M first TN regions, and a $j^{th}$ TN region in the M TN regions is the first TN region when a distance $Z_j$ between the terminal device and the $j^{th}$ TN region meets the following condition:

$$\alpha \times Z_{target} \le Z_j \le \beta \times Z_{target},$$

where $Z_{target}$ represents the first distance threshold, and j is a natural number from 0 to M−1.

Optionally, an occasion on which the terminal device performs cell handover or cell reselection is determined based on a running parameter of the terminal device and/or a satellite in the NTN cell.

Optionally, the running parameter includes a moving speed and a motion trajectory, a motion trajectory of the terminal device and/or the satellite is used to determine a distance between the terminal device and a first boundary, and the first boundary includes one of the following boundaries: an edge of the NTN cell; or a boundary between the NTN cell and a TN region corresponding to the NTN cell, where geographical region information of the TN region is represented by a center location and a radius of the TN region.

Optionally, an occasion on which the terminal device performs cell handover or cell reselection is represented by a first time period T starting from the current instant, and the first time period T is represented by:

$$T = \min(t_1, t_2) - t,$$

where t represents time used by the terminal device to perform the cell handover or the cell reselection;

$$t_1 = \frac{D_1}{V_u - V_t\cos\partial},$$

$D_1$ represents a distance between the terminal device and a closest first boundary in a direction along the motion trajectory of the terminal device, $V_u$ represents a moving speed of the terminal device, $V_t$ represents a moving speed of the satellite, and $\partial$ represents an included angle between $V_u$ and $V_t$; and $$t_2 = \frac{D_2}{V_t\sin\partial},$$

$D_2$ represents a distance between the terminal device and a closest first boundary in a direction perpendicular to the motion trajectory of the terminal device, and sin $\partial$ is not 0.

Figure 12:
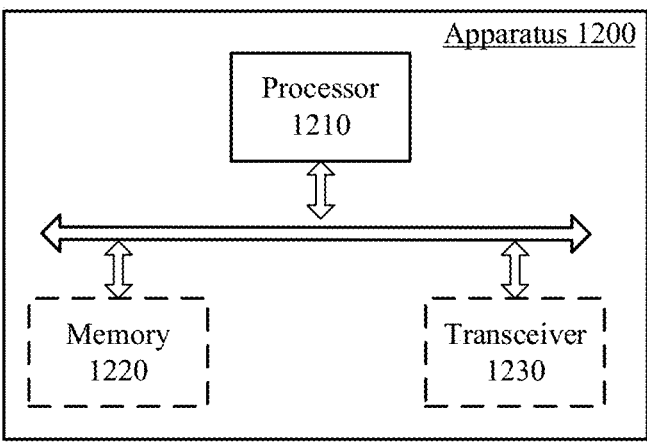
FIG. 12 is a schematic structural diagram of a communications apparatus according to an embodiment of the present application.

FIG. 12 is a schematic structural diagram of a communications apparatus according to an embodiment of the present application. The dotted line in FIG. 12 indicates that the unit or module is optional. The apparatus 1200 may be configured to implement the method described in the foregoing method embodiments. The apparatus 1200 may be a chip, a terminal device, or a network device.

The apparatus 1200 may include one or more processors 1210. The processor 1210 may support the apparatus 1200 to implement the methods described in the foregoing method embodiments. The processor 1210 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1200 may further include one or more memories 1220. The memory 1220 stores a program, and the program may be executed by the processor 1210, so that the processor 1210 performs the methods described in the foregoing method embodiments. The memory 1220 may be separate from the processor 1210 or may be integrated into the processor 1210.

The apparatus 1200 may further include a transceiver 1230. The processor 1210 may communicate with another device or chip through the transceiver 1230. For example, the processor 1210 may transmit data to and receive data from another device or chip through the transceiver 1230.

An embodiment of the present application further provides a computer-readable storage medium for storing a program. The computer-readable storage medium may be applied to the terminal device or the network device provided in embodiments of the present application, and the program causes a computer to perform the methods performed by the terminal device or the network device in embodiments of the present application.

The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

An embodiment of the present application further provides a computer program product. The computer program product includes a program. The computer program product may be applied to the terminal device or the network device provided in embodiments of the present application, and the program causes a computer to perform the methods performed by the terminal or the network device in various embodiments of the present application.

All or some of the foregoing embodiments may be implemented through software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (such as a coaxial cable, an optical fiber, and a digital subscriber line (DSL)) manner or a wireless (such as infrared, wireless, and microwave) manner.

An embodiment of the present application further provides a computer program. The computer program may be applied to the terminal device or the network device provided in embodiments of the present application, and the computer program causes a computer to perform the methods performed by the terminal or the network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, the term "corresponding" may mean that there is a direct or indirect correspondence between two elements, or may mean that there is an association relationship between two elements, which may also be a relationship such as indicating and being indicated, or configuring and being configured.

In embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, predefined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, determining B based on A does not mean determining B based only on A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In the several embodiments provided in the present application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented as indirect couplings or communications connections through some interface, apparatuses or units, and may be implemented in electrical, mechanical, or other forms.

The units described as separate components may or may not be physically separate, and components displayed as units may or may not be physical units, and may be located at one position, or may be distributed on a plurality of network units. Some or all of the units may be selected according to actual requirements to achieve the objectives of the solutions of embodiments.

In addition, functional units in embodiments of the present application may be integrated into one processing unit, each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:

determining, by a terminal device based on first information, one or more first terrestrial network (TN) regions in a non-terrestrial network (NTN) cell that are related to the terminal device, wherein the one or more first TN regions are used by the terminal device to determine one or more TN cells to be measured for cell handover or cell reselection;

wherein the first information comprises a frequency list of a TN region corresponding to the NTN cell, wherein the frequency list comprises a plurality of frequencies; and wherein an occasion on which the terminal device performs the cell handover or the cell reselection is determined based on a distance between the terminal device and a first boundary that is determined based on a center location and a radius of each of the one or more first TN regions, wherein the first boundary comprises one of the following boundaries:

an edge of the NTN cell; or a boundary of the TN region corresponding to the NTN cell, wherein the first information comprises geographical region information of a TN region corresponding to the NTN cell, and the geographical region information of the TN region is represented by a center location and a radius of the TN region.

2. The method according to claim 1, wherein the first information comprises at least one of second information or third information, wherein the second information is carried in a system message, the third information is carried in dedicated signalling, or the third information is determined by the terminal device based on a measurement result.

3. The method according to claim 2, wherein the first information comprises the second information and the third information, the second information is related to the TN region corresponding to the NTN cell, and the third information is related to the first TN region.

4. The method according to claim 2, wherein in a case that the third information is carried in the dedicated signalling, the dedicated signalling comprises radio resource control (RRC) signalling or non-access stratum (NAS) signalling.

5. The method according to claim 4, wherein the third information is carried in one of the following dedicated signalling:

RRC setup signalling received by the terminal device;

RRC connection reconfiguration signalling received by the terminal device;

capability enquiry signalling received by the terminal device; or

RRC resume signalling received by the terminal device.

6. The method according to claim 2, wherein in a case that the third information is determined by the terminal device based on the measurement result, the measurement result comprises transmit power of a network device corresponding to one or more first TN regions measured by the terminal device.

7. The method according to claim 6, wherein a target TN cell for cell handover or cell reselection is determined based on at least one of relative distances between the terminal device and a plurality of network devices corresponding to the one or more first TN regions, or load status of the plurality of network devices corresponding to the one or more first TN regions.

8. The method according to claim 7, wherein each first TN region in the one or more first TN regions corresponds to N network devices, N is a natural number greater than 1, the target TN cell is determined based on first parameters of the N network devices corresponding to each first IN region, and a first parameter $Q_{pu,i}$ of an $i^{th}$ network device in the N network devices is represented as:

$$Q_{pu,i} = P_i * \left(1 - \frac{Z_i}{R_i}\right) * (1 - L_i),$$

wherein $P_i$ represents transmit power of the $i^{th}$ network device, i is a natural number from 0 to N−1, $Z_i$ represents a distance between the terminal device and a center point of the $i^{th}$ network device, $R_i$ represents a distance from the center point of the $i^{th}$ network device to an edge of a service area, $L_i$ represents load saturation of the $i^{th}$ network device, and a value range of $L_i$ is [0, 1].

9. The method according to claim 1, wherein the TN region corresponding to the NTN cell comprises a TN region covered by the NTN cell at a current instant, and the TN region corresponding to the NTN cell further comprises at least one of a TN region covered by the NTN cell before the current instant or a TN region covered by the NTN cell after the current instant.

10. The method according to claim 1, wherein the one or more first TN regions are determined based on distances between the terminal device and a plurality of TN regions corresponding to the NTN cell.

11. The method according to claim 10, wherein the one or more first TN regions are further determined based on at least one of a first distance threshold or a coefficient related to the first distance threshold.

12. The method according to claim 11, wherein the coefficient of the first distance threshold comprises a first coefficient a and a second coefficient β, the NTN cell corresponds to M TN regions, and a $j^{th}$ TN region in the M TN regions is the first TN region when a distance $Z_j$ between the terminal device and the $j^{th}$ TN region meets the following condition:

$$\alpha \times Z_{target} \le Z_j \le \beta \times Z_{target},$$

wherein $Z_{target}$ represents the first distance threshold, and j is a natural number from 0 to M−1.

13. The method according to claim 1, wherein the occasion on which the terminal device performs the cell handover or the cell reselection is determined further based on a running parameter of at least one of the terminal device or a satellite in the NTN cell.

14. The method according to claim 13, wherein the running parameter comprises a moving speed and a motion trajectory.

15. The method according to claim 14, wherein an occasion on which the terminal device performs the cell handover or the cell reselection is represented by a first time period T starting from a current instant, and the first time period T is represented by:

$$T = \min(t_1, t_2) - t,$$

wherein t represents time used by the terminal device to perform the cell handover or the cell reselection;

$t\_1 = D\_1/(V_u - V_t\cos\partial D\_1$ represents a distance between the terminal device and a closest first boundary in a direction along the motion trajectory of the terminal device, $V_u$ represents a moving speed of the terminal device, $V_t$ represents a moving speed of the satellite, and $\partial$ represents an included angle between $V_u$ and $V_t$; and $$t_2 = \frac{D_2}{V_t \sin\partial} - 2$$

represents a distance between the terminal device and a closest first boundary in a direction perpendicular to the motion trajectory of the terminal device, and sin $\partial$ is not 0.

16. A method for wireless communication, comprising:

sending, by a network device, first information to a terminal device, wherein the first information is used to determine one or more first terrestrial network (TN) regions in a non-terrestrial network (NTN) cell that are related to the terminal device, and the one or more first TN regions are used to determine one or more TN cells to be measured for cell handover or cell reselection;

wherein the first information comprises a frequency list of a TN region corresponding to the NTN cell, wherein the frequency list comprises a plurality of frequencies; and wherein an occasion on which the terminal device performs the cell handover or the cell reselection is determined based on a distance between the terminal device and a first boundary that is determined based on a center location and a radius of each of the one or more first TN regions, wherein the first boundary comprises one of the following boundaries:

an edge of the NTN cell; or a boundary of the TN region corresponding to the NTN cell, wherein the first information comprises geographical region information of a TN region corresponding to the NTN cell, and the geographical region information of the TN region is represented by a center location and a radius of the TN region.

17. The method according to claim 16, wherein the first information comprises at least one of second information or third information, the second information is carried in a broadcast message, the third information is carried in dedicated signalling, or the third information is determined by the terminal device based on a measurement result.

18. The method according to claim 17, wherein the first information comprises the second information and the third information, the second information is related to the TN region corresponding to the NTN cell, and the third information is related to the first TN region.

19. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

determining, by a terminal device based on first information, one or more first terrestrial network (TN) regions in a non-terrestrial network (NTN) cell that are related to the terminal device,

US 12,684,439 B2

35 wherein the one or more first TN regions are used by the
terminal device to determine one or more TN cells to be
measured for cell handover or cell reselection;
wherein the first information comprises a frequency list of
a TN region corresponding to the NTN cell, wherein
the frequency list comprises a plurality of frequencies;
and
wherein an occasion on which the terminal device per-
forms the cell handover or the cell reselection is
determined based on a distance between the terminal
device and a first boundary that is determined based on
a center location and a radius of each of the one or more
first TN regions, wherein the first boundary comprises
one of the following boundaries:
an edge of the NTN cell; or
a boundary of the TN region corresponding to the NTN
cell, wherein the first information comprises geo-
graphical region information of a TN region corre-
sponding to the NTN cell, and the geographical
region information of the TN region is represented
by a center location and a radius of the TN region.

* * * * *